United States Patent

Iwanaga et al.

[11] Patent Number: 5,861,687
[45] Date of Patent: Jan. 19, 1999

[54] MOTOR AND RECORDING AND/OR REPRODUCING APPARATUS USING THE MOTOR

[75] Inventors: Atsushi Iwanaga; Masao Ohkita, both of Miyagi-ken; Kesatomo Saito, Tochigi-ken, all of Japan

[73] Assignee: Alps Electric Co., Ltd., Tokyo, Japan

[21] Appl. No.: 491,337

[22] Filed: Jun. 30, 1995

[30] Foreign Application Priority Data

Jul. 6, 1994 [JP] Japan ..................................... 6-154799

[51] Int. Cl.⁶ ................................. H02K 7/08; H02K 1/22
[52] U.S. Cl. ............................. 310/90; 384/609; 384/615
[58] Field of Search .............................. 310/90; 384/227, 384/603, 609, 615, 617

[56] References Cited

U.S. PATENT DOCUMENTS

| | | | |
|---|---|---|---|
| 765,462 | 7/1904 | Dennison | 369/269 |
| 778,379 | 12/1904 | Slentz | 384/609 |
| 2,068,589 | 1/1937 | Annen | 384/615 |
| 5,013,947 | 5/1991 | Ide | 310/67 R |
| 5,128,571 | 7/1992 | Itsu | 310/67 R |
| 5,223,756 | 6/1993 | Bello | 310/90 |
| 5,252,871 | 10/1993 | Inoue | 310/90 |
| 5,336,955 | 8/1994 | Suzuki et al. | 310/90 |
| 5,445,456 | 8/1995 | Isoda et al. | 384/126 |

FOREIGN PATENT DOCUMENTS

WO 89/02141  3/1989  WIPO.

*Primary Examiner*—Thomas M. Dougherty
*Assistant Examiner*—Tran N. Nguyen
*Attorney, Agent, or Firm*—Brinks Hofer Gilson & Lione

[57] ABSTRACT

A motor and a recording and/or reproducing apparatus using the motor. The motor includes a rotational member, a fixed member, a stopper member and a set of balls. The rotational member is formed by bending a first plate, and includes a first V-shaped bearing guide groove and central rotational shaft having a hole formed therein. The fixed member is formed with a second V-shaped bearing guide groove and bent portions which are used to attach the fixed member to a chassis. The balls are mounted in the first and second V-shaped bearing guide grooves and allow the rotational member to rotate relative to the fixed member. The stopper member is inserted through a central opening in the fixed member and is received in the hole formed in the rotational shaft, thereby connecting the rotational member to the fixed member so that the motor can be transported as a unit without separating.

7 Claims, 3 Drawing Sheets

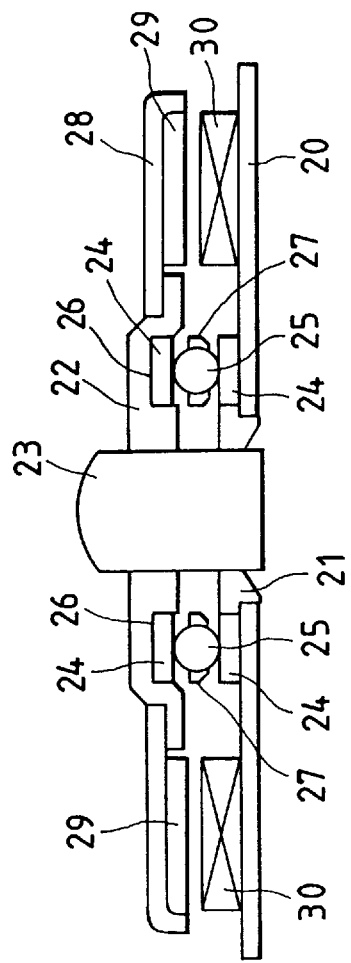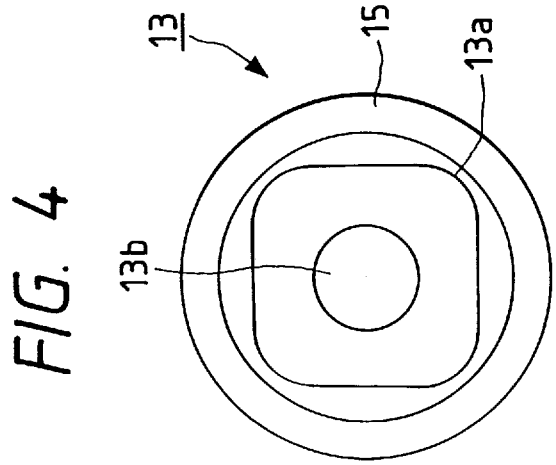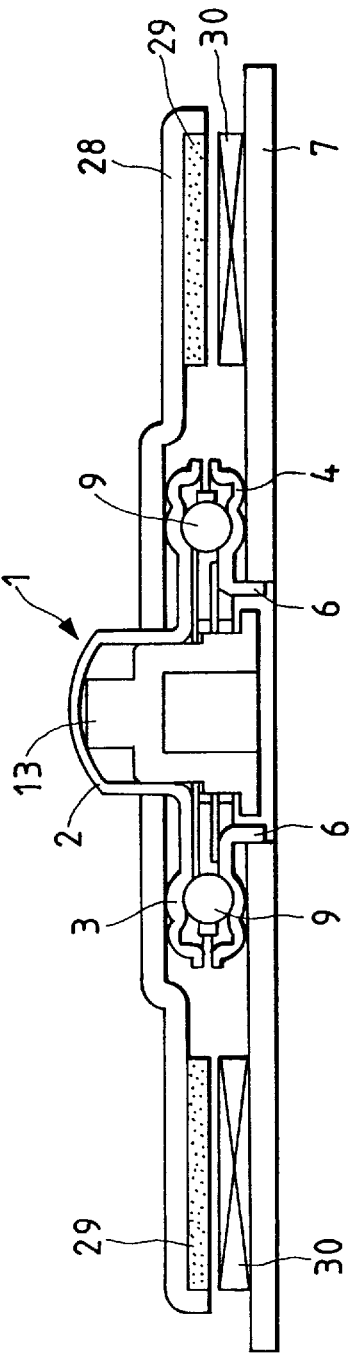

MOTOR AND RECORDING AND/OR REPRODUCING APPARATUS USING THE MOTOR

BACKGROUND OF THE INVENTION

The present invention relates to a motor and a recording and/or reproducing apparatus using the motor, and particularly to a motor and a recording and/or reproducing apparatus using the motor, which is characterized by the bearing construction.

FIG. 6 shows a spindle motor constituted by a conventional bearing construction.

In FIG. 6, reference numeral 20 designates a base (chassis), on which is caulked and mounted an oil-contained bearing 21. A center shaft 23 is pressed into and secured to a hub bed 22 as a rotary body, the center shaft 23 being inserted into the oil-contained bearing 21.

Thrust bearings 24 are mounted through balls 25 in kerves 26, 26 provided in the hub bed 22 and at positions opposite to the kerves 26, the hub bed 22 being rotatable about the center shaft 23. Reference numeral 27 designates a retainer, which performs a function to control a movement of the ball 25 in a lateral direction of a paper surface. There is generated a force for rotating the hub bed 22 by means of the action of a magnet 29 fixedly mounted on a rotor yoke 28 mounted on the hub bed 22 and a current flowing through a coil mounted on the base 20.

However, the aforementioned prior art had the following problems.

A clearance is produced between the oil-contained bearing 21 and the center shaft 23, thus causing a deflection in the center shaft 23 during rotation.

Further, a step for pressing the center shaft 23 into the hub bed 22 and a step of fastening the oil-contained bearing 21 to the base are required. Furthermore, the cost of the center shaft 23 is high. Further, a slip friction occurs in the oil-contained bearing 21.

Moreover, with recent trend of a smaller, thinner computer and higher performance of a computer, a floppy disk drive (FDD) as a memory has been demanded to be thinner. Particularly, in a 3.5 inch FDD, a thickness of 42 mm at the outset of development has been changed to 25.4 mm, and further, a ½ inch (12.7 mm) height thereof has been marketed. Now, there is a demand for to a thickness of 10 mm or so.

On the other hand, format of a 3.5 inch disk remains unchanged. Further, the provision of front-loading is necessary for the sake of using convenience. In this case, an absolute condition is to make a spindle motor thinner for making a drive thinner. A precondition for making a thinner spindle motor is to provide a thinner bearing, which is recongnized as a difficult problem.

In addition, with the trend of portability of computers represented by a personal computer, a word processor and the like, a lower power consumption FDD has been strongly demanded in terms of the necessity for relieving power consumption of a battery.

Further, since a current market price of FDD is 1/10 or less than the original market price, the spindle motor naturally becomes the target of being lowered in cost.

SUMMARY OF THE INVENTION

This invention has been done in order to remove these disadvantages and its first object is to provide an inexpensive motor in which deflection of a center shaft reduced rotation, fewer parts and fewer assembling steps, eliminates the necessity of a step of pressing-in a movable portion and a shaft, and can eliminate an expensive shaft.

A second object of the present invention is to provide a motor in which a fixed ring can be secured to a chassis without play merely by means of a simple pressing-in step.

A third object of the present invention is to provide a motor which uses a stopper to thereby provide a single unit without being separated during transportation.

A fourth object of the present invention is to provide a recording and or reproducing apparatus which uses the motor according to the present invention to thereby enable the provision of a thinner configuration, a lower power consumption, and a lower cost.

BRIEF DESCRIPTION OF THE DRAWINGS

FIG. 4 is a plan view of a stopper for the motor according to the present invention;

FIG. 5 is a view showing the whole construction of the motor according to the present invention; and FIG. 6 is a view showing a spindle motor constituted with a conventional bearing construction.

DESCRIPTION OF THE PREFERRED EMBODIMENT

Figure 1:
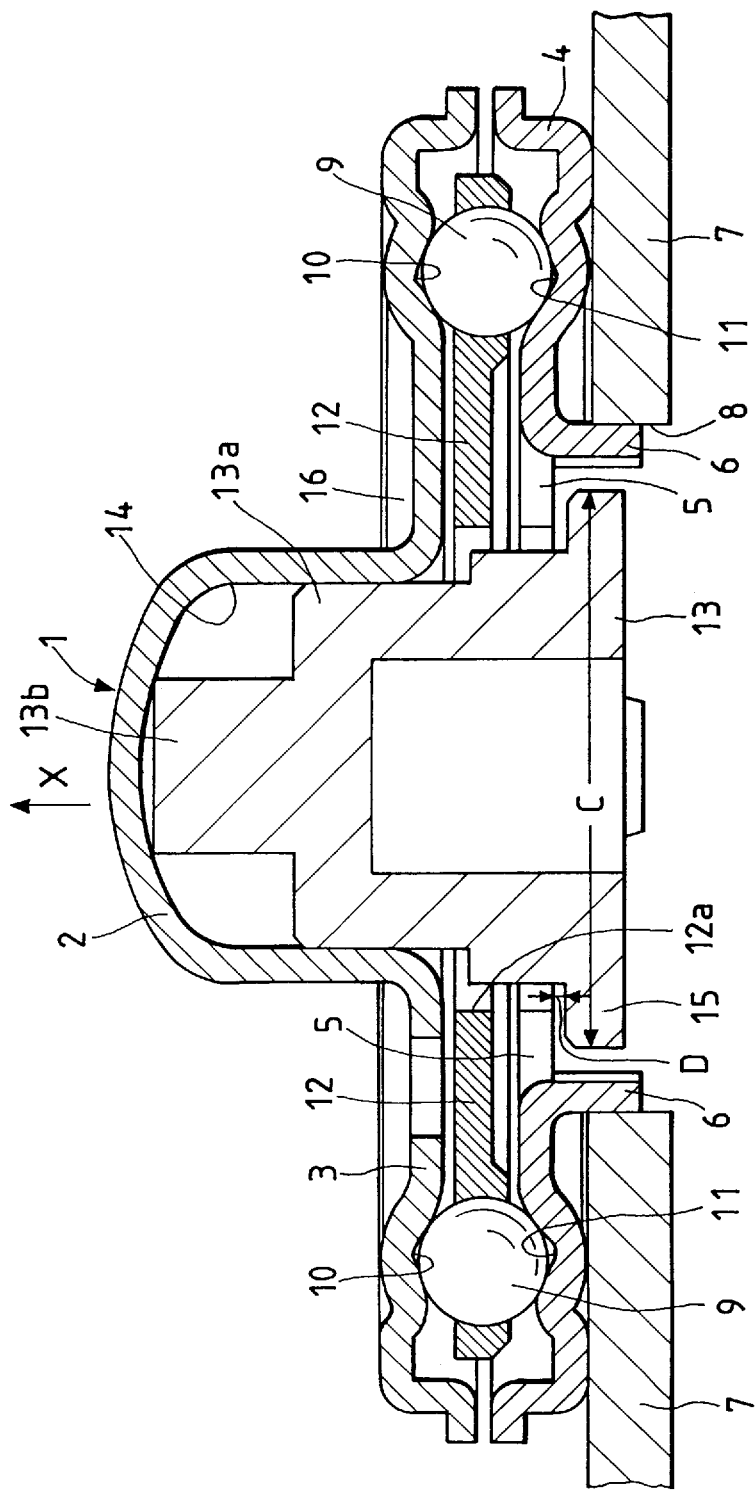
FIG. 1 is an explanatory view showing a bearing construction of a motor according to the present invention.
Figure 2:
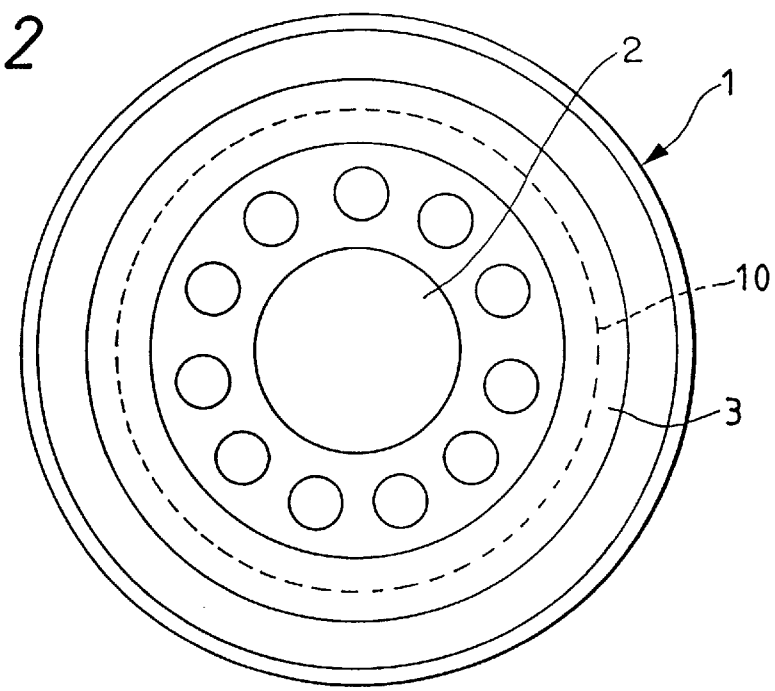
FIG. 2 is a plan view of the bearing construction shown in FIG. 1.
Figure 3:
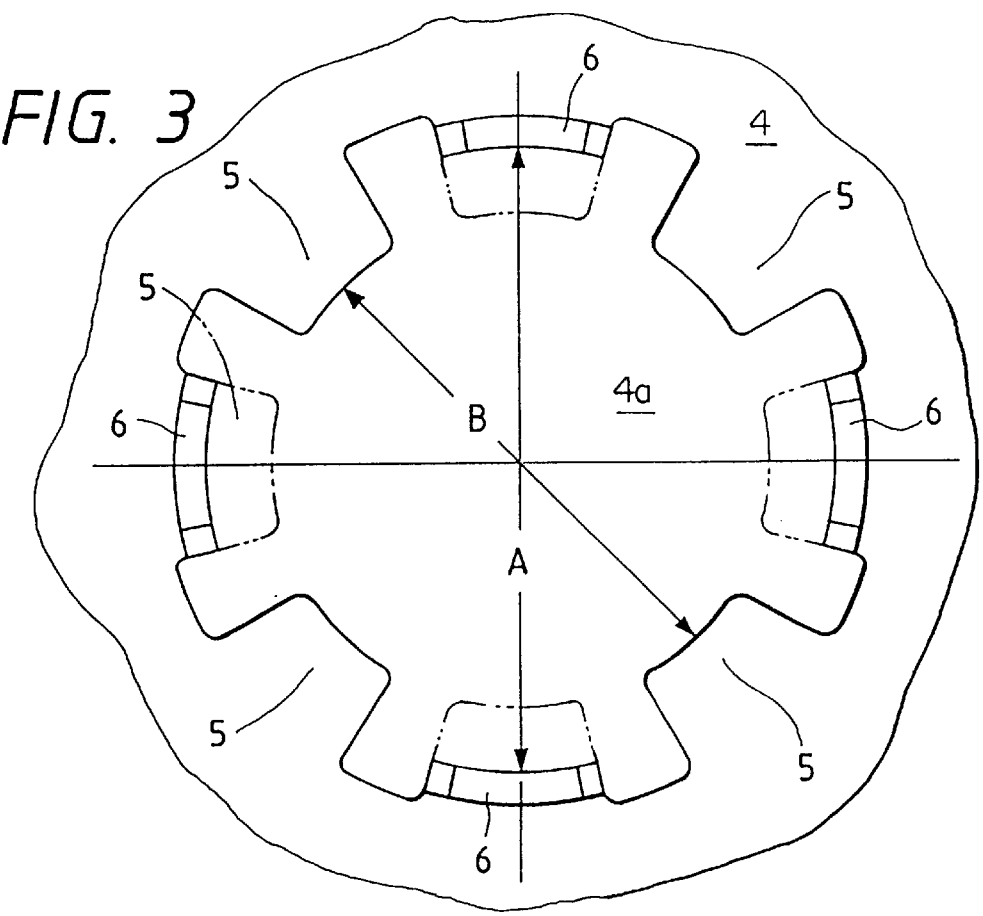
FIG. 3 is an explanatory view showing a plurality of petal-like protrusions formed on the inner peripheral side of a fixed ring of the motor according to the present invention.

An embodiment of the present invention will be described hereinafter with reference to the drawings.

First, a bearing construction which constitutes a feature of the motor according to the present invention will be explained.

Referring to FIGS. 1 to 5, reference numeral 1 designates a movable ring. The movable ring 1 comprises a cylindrical rotational shaft 2 having a lower portion opened and a rotational portion 3 extending from the lower edge of the rotational shaft 2 to the outer periphery, which are integrally formed from a thin-wall plate.

Reference numeral 4 designates a fixed ring opposed to the rotational portion 3 of the movable ring 1. The fixed ring 4 is also formed from a thin-wall plate. The fixed ring 4 includes a central opening 4a surrounded by an inner peripheral edge (side) having a plurality of petal-like protrusions 5, some of the plurality of petal-like protrusions 5, 5 . . . being bent into an L-shape (every other one in FIG. 3) to form bent portions 6, 6. If the bent portion 6 is formed into an inwardly directed taper-like bent portion, it can be easily inserted into a chassis 7. Further, if it is formed into an outwardly directed taper-like bent portion 6, it can be firmly fitted into the chassis 7.

The fixed ring 4 is located and secured to the chassis 7 by inserting the bent portion 6 into a hole 8 provided in the chassis 7 from the upper portion of FIG. 1 to fit (press) it into the chassis 7. It is to be noted that if the fixed ring 4 and the chassis 7 are merely pressed-in and secured, the bent portion 6 may be provided in the chassis 7 in place of the fixed ring 4.

Balls 9, 9 . . . are annularly arranged at equal intervals between the rotational portion 3 of the movable ring 1 and the fixed ring 4, and the rotational portion 3 of the movable ring 1 and the fixed ring 4 are formed with V-shaped grooves 10 and 11 at contact portions with the balls 9. Alternatively, the V-shaped grooves 10 and 11 are made in the form of laterally (outer and inner peripheral sides) asymmetrical V-shaped grooves whereby the contact state between the balls 9 and the V-shaped grooves 10 and 11 is improved so as not to produce a slipping phenomenon during rotation.

For example, the lateral (outer and inner peripheral sides) asymmetry of the V-shaped grooves 10 and 11 is made to be the asymmetrical V-shaped grooves under the conditions that a ratio between a contact locus diameter of the balls 9 on the inner peripheral side of the V-shaped grooves 10, 11 and a contact locus diameter of the balls 9 on the outer peripheral side of the V-shaped grooves 10, 11 is substantially the same as a ratio of a contact locus diameter of the V-shaped groove on the ball side.

Of course, it is possible that a symmetrical V-shaped groove may be employed depending upon the service life characteristics demanded.

Reference numeral 12 denotes a retainer, which performs a role of a track guide for the balls 9, 9 . . . in a manner similar to that previously described with respect to prior art. Reference numeral 12a designates an opening in the central portion of the retainer 12.

Reference numeral 13 designates a stopper formed from a mold member, and a fitting shaft portion 13a provided on the stopper 13 is pressed into a hole 14 formed in the rotational shaft portion 2 of the movable ring 1. The stopper 13 is provided at the lower end with a collar 15, whose outer diameter C is set to be larger than an inner diameter B between the petal-like protrusions 5, 5 . . . and smaller than an inner diameter A between the L-shaped bent portions 6, 6 . . . Reference numeral 13b designates to protrusion provided on the upper surface of the stopper 13.

Accordingly, even if a force in the direction of arrow X in FIG. 1 is applied to the movable ring 1, the collar 15 of the stopper 13 impinges upon the petal-like protrusion 5 and the movable ring 1 cannot be moved any further in the direction of arrow X. It is to be noted that the dimension D in FIG. 1 (between the lower surface of the petal-like protrusions 5 and the upper surface of the collar 15) will suffice to be a size of a clearance to the extent that the balls 9 cannot slip out.

By using the stopper 13, an assembly of the movable ring 1 and the fixed ring 4 can be handled as a single unit, which is not separated during transportation. With this, the spindle motor can be completed under the state that it is assembled as a bearing unit. The spindle motor can be incorporated into the chassis 7 for the spindle motor merely by being fitted (or pressed) into the chassis using the L-shaped bent portion 6.

While in the description of the above embodiment, a description has been made merely of the bearing portion of the motor, it is to be noted that the rotor yoke 28, the magnet 29 and the coil 30 previously described with respect to prior art may be mounted on the aforementioned bearing portion as shown in FIG. 5 to complete a motor. More specifically, the rotor yoke 28 having the magnet 29 fixedly mounted is mounted on the movable ring 1, and the coil 30 is mounted at a position opposed to the magnet 29 on the chassis to complete a motor shown in FIG. 5. In a recording/reproducing apparatus using the aforementioned motor, a media such as a floppy disk is placed on the (see FIG. 1) provided on the rotational portion 3 and is rotatably driven by the motor.

In the above-described embodiment, since the rotational shaft portion 2 is integral with the rotational portion 3, the step of pressing the rotor and shaft of the thrust bearing is not necessary, and a pressing paste is not required accordingly, thus enabling a smaller and thinner configuration, being not necessary to consider a pressing strength and avoiding an expensive shaft to provide an apparatus at low cost.

Further, in the above-described embodiment, the movable ring 1 and the fixed ring 4 are finished merely by the drawing and press (coining) of a plate, and the ball transfer grooves 10 and 11 of the movable ring 1 and the fixed ring 4 can be processed by the same press (coining) mold to eliminate a difference in relative dimensional precision.

Further, the transfer grooves 10 and 11 for the balls 9 are formed into a V-shape configuration so as to sandwich the balls 9 between the grooves 10 and 11. Therefore, a bearing having a rotational center and a rotational surface, that is, an axial direction can be completed merely by applying a thrust load.

With respect to a degree of roughness of the surface of the transfer grooves 10 and 11 for the ball 9, since a punch surface of the press mold is transferred as it is, it is not necessary to polish the transfer grooves 10 and 11 for the ball 9 after press molding. Further, the degree of roughness of the surface of the transfer grooves 10 and 11 for the ball 9 can be maintained in desired quality merely by periodically polishing the punch surface.

In the above-described embodiment, since a single bearing unit can be constituted by a stopper 13 formed from a mold member, a spindle motor can be completed in the state of being assembled as a bearing unit. Further, the motor is not separated even during moving (transportation), and the stopper 13 serves to prevent entry of dust from outside.

Furthermore, in the above-described embodiment, the fixed ring 4 can be secured to the chassis 7 of the spindle motor merely by simply pressing the bent portion 6 into the chassis 7. Thus, the securement without play can be completed. Both the movable ring 1 and the fixed ring 4 take over the condition that the same mold is used up to the middle step.

In the above-described embodiment, an angle of inclination of the V-shaped grooves 10 and 11 is intentionally made asymmetric laterally (outer and inner peripheral sides) to obtain a smooth rotational performance.

Moreover, in the above-described embodiment, by using the bearing unit having the above-described features, a motor whose thickness of a bearing portion is very thin can be obtained, and since part costs associated with the bearing portion including the shaft, are eliminated an extremely inexpensive motor can be obtained. Further, since there exists no frictional portion, the rotational resistance of the bearing is extremely low and a lower power consumption of the motor can be realized.

Besides, in the above-described embodiment, by using such a motor as described, it is possible to provide a recording and or reproducing apparatus which can be made thinner, with lower power consumption and lower cost.

What is claimed is:

1. A motor comprising:

a fixed member fixedly arranged on a chassis;

a rotational member arranged opposedly of said fixed member, said rotational member including a hollow cylindrical rotational shaft extending upward from said rotational member; and a rolling member interposed between said rotational member and said fixed member;

said rotational member and said fixed member are relatively rotatably connected by a stopper member having a first end press-fitted through a central opening of the fixed member and received in a hole formed in said rotational shaft, and a collar formed at a second end of the stopper member, the collar having a diameter which is greater than a diameter of the central opening of the fixed member; and wherein said rotational member and said rotational shaft are integrally formed by bending a single thin walled plate.

2. A motor comprising:

a fixed member fixedly arranged on a chassis;

a rotational member arranged opposedly of said fixed member, said rotational member including a material integrally formed hollow cylindrical rotational shaft extending upward from said rotational member; and a rolling member interposed between said rotational member and said fixed member;

wherein shapes of said rotational member and said rotational shaft are integrally formed by bending a single thin walled plate into said shaped.

3. The motor as in claim 2, wherein said fixed member is formed by pressing a second thin-walled plate.

4. The motor as in claim 2, wherein said fixed member is formed with bent portions for detachably connecting said fixed member to said chassis.

5. A motor comprising:

a fixed member fixedly arranged on a chassis;

a rotational member arranged opposedly of said fixed member, said rotational member including a rotational shaft; and a rolling member interposed between said rotational member and said fixed member;

wherein said rotational member and said rotational shaft are integrally formed from a single plate; and wherein said fixed member includes an inner peripheral edge surrounding a central opening, and a plurality of petal-like protrusions extending from the inner peripheral edge, some of said petal-like protrusions being bent to form bent portions for detachably connecting said fixed member to said chassis.

6. A recording and/or reproducing apparatus for carrying out reading and/or writing date from/to a disk rotatably driven by a motor, wherein said motor of said apparatus comprises;

a chassis;

a fixed member fixedly arranged on said chassis;

a rotational member arranged opposedly of said fixed member, said rotational member including a material integrally formed rotational shaft; and a rolling member interposed between said rotational member and said fixed member;

wherein shapes of said rotational member and said rotational shaft are integrally formed by bending a single thin-walled plate into said shapes.

7. The recording and/or reproducing apparatus as in claim 6, wherein one of said fixed member and said chassis is formed with bent portions, and said fixed member and said chassis are detachably connected using said bent portions.

* * * * *

UNITED STATES PATENT AND TRADEMARK OFFICE
CERTIFICATE OF CORRECTION

PATENT NO.   : 5,861,687
DATED        : January 19, 1999
INVENTOR(S)  : Iwanaga et al.

It is certified that error appears in the above-identified patent and that said Letters Patent is hereby corrected as shown below:

In the Claims

Column 5, in claim 5, line 11, replace "shaped" with --shapes--.

Column 6, In claim 6, line 2, replace "date" with --data--.

Signed and Sealed this

Twenty-seventh Day of July, 1999

Attest:

Attesting Officer

Q. TODD DICKINSON

Acting Commissioner of Patents and Trademarks